(12) United States Patent
Radde et al.

(10) Patent No.: US 8,382,152 B2
(45) Date of Patent: Feb. 26, 2013

(54) HORN MODULE FOR A VEHICLE STEERING WHEEL AND VEHICLE STEERING WHEEL

(75) Inventors: Werner Radde, Babenhausen (DE); Ralph Frisch, Moembris (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 71 days.

(21) Appl. No.: 13/061,992

(22) PCT Filed: Sep. 9, 2009

(86) PCT No.: PCT/EP2009/006539
§ 371 (c)(1),
(2), (4) Date: Mar. 3, 2011

(87) PCT Pub. No.: WO2010/028815
PCT Pub. Date: Mar. 18, 2010

(65) Prior Publication Data
US 2011/0181029 A1    Jul. 28, 2011

(30) Foreign Application Priority Data

Sep. 9, 2008   (DE) .................. 10 2008 046 382

(51) Int. Cl.
*B60R 21/203* (2006.01)
(52) U.S. Cl. ..................................... 280/731; 200/61.54
(58) Field of Classification Search .................. 280/731; 200/61.54, 61.55, 61.56, 61.57
See application file for complete search history.

(56) References Cited

U.S. PATENT DOCUMENTS

| 5,062,661 | A | * | 11/1991 | Winget ......................... 280/731 |
| 5,217,252 | A | * | 6/1993 | Kawaguchi et al. .......... 280/731 |
| 5,303,952 | A |   | 4/1994 | Shermetara et al. |
| 5,423,569 | A |   | 6/1995 | Reighard et al. |
| 5,489,806 | A | * | 2/1996 | Harris et al. ................... 280/731 |
| 5,721,409 | A | * | 2/1998 | Enders ........................... 280/731 |
| 6,161,891 | A | * | 12/2000 | Blakesley ................... 296/65.01 |
| 6,236,301 | B1 | * | 5/2001 | Langford et al. ................ 338/6 |
| 6,236,309 | B1 | * | 5/2001 | Haag et al. .................... 340/438 |
| 6,491,319 | B2 | * | 12/2002 | Bonn ............................. 280/731 |
| 2002/0041087 | A1 |   | 4/2002 | Bonn |
| 2005/0236820 | A1 | * | 10/2005 | Amamori ..................... 280/731 |

FOREIGN PATENT DOCUMENTS

EP    0 568 764 A1   11/1993
WO    WO 00/50264   8/2000

* cited by examiner

*Primary Examiner* — Joseph Rocca
*Assistant Examiner* — Robert A Coker
(74) *Attorney, Agent, or Firm* — Tarolli, Sundheim, Covell & Tummino LLP

(57) ABSTRACT

A horn module (12) in a vehicle steering wheel has at least one electronic horn sensor (20) including a trigger component (22) deflectable upon application of a horn operating force (F). At the trigger component (22) at least one strain gauge (24) is arranged by deflection of which a signal is produced.

18 Claims, 2 Drawing Sheets

HORN MODULE FOR A VEHICLE STEERING WHEEL AND VEHICLE STEERING WHEEL

FIELD OF THE INVENTION

The invention relates to a horn module for a vehicle steering wheel.

BACKGROUND OF THE INVENTION

Since the serial introduction of airbag modules in steering wheels it has been aimed at improving the arrangement and the integration of the horn circuit. A wide-spread concept provides to mount the airbag module in a floating manner, as a so-called floating horn, wherein the entire airbag module is pressed into the steering wheel hub for operating the horn. Hereby a horn circuit is generally closed, wherein part of a switch is provided at the airbag module and the other part is provided at the steering wheel hub. When the horn circuit is closed, current flows and an evaluation circuit causes triggering of an acoustic alarm signal.

The distance thus covered by the airbag module is relatively long. This entails the fact that between the airbag module and the wall of its receipt in the steering wheel a relatively wide gap must exist to guarantee safe movement of the airbag module. This gap turns out to be disturbing and should be kept as small as possible, however.

SUMMARY OF THE INVENTION

It is the object of the invention to provide a horn module by which the movement of the airbag module in the steering wheel can be minimized for operating the horn.

In accordance with the invention, for this purpose in a horn module for a vehicle steering wheel at least one electronic horn sensor including a trigger component deflectable upon application of a horn operating force is provided, wherein at the trigger component at least one strain gauge is arranged by deflection of which a signal is produced. Instead of closing, as conventionally, an electric circuit by causing two electric contacts to get in contact with each other, the signal is produced by deflecting the trigger component and by varying the resistance of the strain gauge or a voltage associated with the variation of an electronic parameter of the strain gauge. Such known strain gauge has to be deflected by a very small amount only in order to provide a safely measurable signal. In this way, the distances required to operate the horn can be definitely reduced. Since the airbag module in the steering wheel need no longer travel over that long distances, also the gaps between the airbag module and the walls of its receipt can be reduced.

When deflecting the trigger component the strain gauge is varied as to its shape and/or length, whereby an electronic value defined by the strain gauge, preferably its electric resistance or a voltage associated with the same, is varied.

This variation can be detected, e.g., by an evaluation circuit which preferably implements a signal processing and produces a signal which ultimately results in the sounding of an acoustic alarm signal especially from the electronic value defined by the strain gauge.

The evaluation circuit is preferably configured such that it distinguishes between real acoustic alarm signals and short interference pulses which are generated e.g. when driving on a bumpy road by short-time vibration of the airbag module due to its inertia when passing a road hole, for instance. Those interference pulses can be easily distinguished from real acoustic alarm signals by way of their shorter duration.

In order to determine a defined output value it is preferably provided that the evaluation circuit is programmed such that it determines the electronic value defined by the strain gauge as zero value at a predetermined starting time. This can be done, for instance, every time the vehicle is started.

The trigger component preferably includes a bar-shaped portion deflectable upon operation of the horn. This portion can have a freely projecting end, for instance, so that it adopts approximately the shape of a tongue. It would also be possible to design the bar-shaped portion in the form of a bridge.

At least one strain gauge is advantageously positioned at the transition of the bar-shaped portion to the remaining trigger component, as at this position an especially great variation of the electronic value defined by the strain gauge has to be expected by the variation of the curvature when deflecting the bar-shaped portion. Since the strain gauges are very sensitive, in the case of a length of the bar-shaped portion of approx. 1.5 cm a maximum deflection by approx. 0.2 mm is sufficient to produce a safely detectable signal.

Preferably the trigger component forms a portion of a board, especially a printed board.

The deflectable bar-shaped portion is preferably integrally connected to the board and is cut out or milled out of the board, for instance.

This configuration has the advantage that for the entire horn module one single printed board can be employed on which also further horn sensors as well as the evaluation circuit, where appropriate, can be disposed.

For a better detection of the movement of the airbag module plural horn sensors can be provided. For instance, four or five horn sensors can be used all of which are preferably disposed in a common element plane and advantageously all on the same board.

The evaluation circuit, too, can be arranged on the same board as the horn sensor or sensors. Of advantage, one single evaluation circuit performs the evaluation of the data of all strain gauges of the entire horn module.

An electronic contacting of the airbag module is not necessary, because no electronic contact has to be made between the airbag module and the horn module, but the acoustic alarm signal is generated solely by the deflection of the strain gauge and the variation of the electronic value defined by the strain gauge.

In the vicinity of the strain gauge preferably mounting positions for mounting the horn sensor are provided so that a controlled deflection of the trigger component by a predetermined amount is ensured. The mounting is performed, for instance, at the steering wheel hub or a further component connected to the steering wheel hub. Preferably the mounting takes place on both sides of the bar-shaped portion.

Also the entire horn module can be mounted to the steering wheel hub via the mounting positions.

Strain gauges adapted to be used within the scope of the invention are known, for example, from the weighing technology.

In order to distinguish an acoustic alarm signal from a variation of the electronic value defined by the strain gauge which is based on thermal expansion, for instance, it is possible to provide at least one strain gauge also on the opposite side of the horn sensor. From the correlation of the variations of the electronic values provided by the strain gauges on the different sides, it can be easily decided in the evaluation circuit whether a real acoustic alarm signal or an interfering signal is concerned.

In a preferred embodiment of the invention plural strain gauges extending in parallel are provided which improves the quality of the signal.

The strain gauge can be formed, for instance, by printing a resistance varnish onto the horn sensor. For this purpose, e.g. a structure made of resistance varnish can be printed onto the horn sensor by means of an appropriate known printer, e.g. on the basis of an ink jet printer. It is also possible, however, to use other materials known for strain gauges.

The trigger component is preferably mounted in a biased manner, which permits a tolerance compensation for the module in a simple way. For this purpose, additional springs may be required.

The invention is preferably realized in a vehicle steering wheel in which an airbag module is movably arranged in the hub area, wherein at the airbag module at least one contact point is provided which contacts a trigger component to deflect the trigger component. This is, as mentioned already, a purely mechanical contact and not the closing of an electric circuit. By deflecting the airbag module a deflection of the trigger component is caused, wherein the strain gauge is geometrically modified by the deflection of the trigger component, whereby an electronic value defined by the strain gauge varies; which is detected, in turn, by an evaluation circuit and is interpreted as acoustic alarm signal. This signal is appropriately transmitted and an acoustic alarm signal is generated.

BRIEF DESCRIPTION OF DRAWINGS

Further features and advantages of the invention are resulting from the following description of an embodiment in combination with the attached drawings in which.

DESCRIPTION OF EXAMPLARY EMBODIMENT

Figure 1:
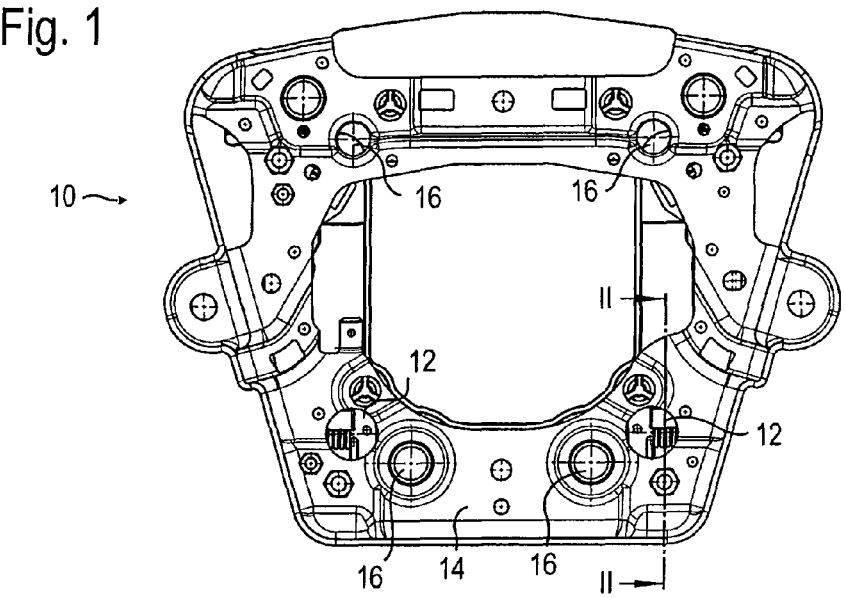
FIG. 1 is a schematic view of a hub area of a vehicle steering wheel according to the invention comprising an installed horn module according to the invention.
Figure 2:
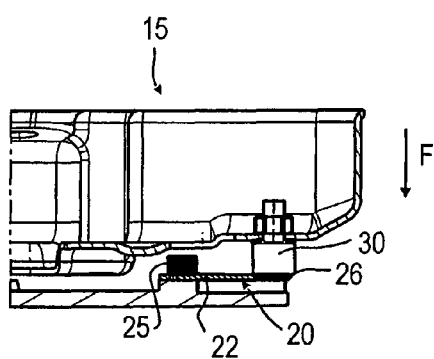
FIG. 2 shows a section along the line II-II of FIG. 1.

FIG. 1 illustrates the hub area 10 of a vehicle steering wheel not shown in detail comprising a horn module 12 (cf. FIGS. 6 and 8) which is visible here in sections only. The horn module 12 is located below a support 14 for an airbag module 15 (schematically shown in FIG. 2). Both the horn module 12 and the support 14 are fixedly connected to the hub area 10. In the support 14 plural openings 16 are formed through which locking pins of the airbag module 15 snapping in place at a catch spring in a manner fixed to the steering wheel (not shown) are inserted. The airbag module 15 is movable in the direction perpendicular to the plane of projection of FIG. 1 by a predetermined degree.

Figure 6:
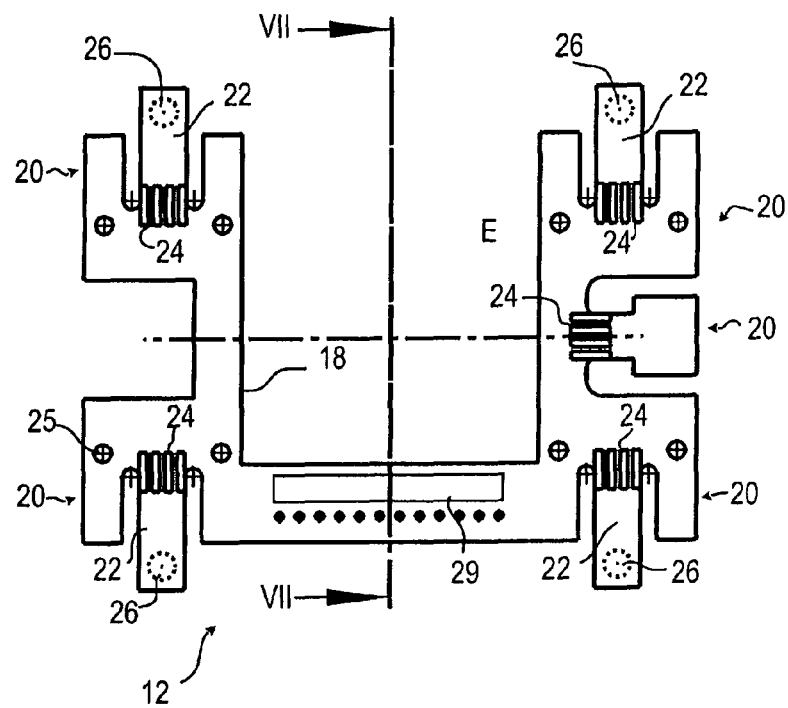
FIG. 6 is a schematic top view onto a horn module according to the invention including five horn sensors.

The horn module 12 includes a large-area board 18 formed of one single printed board in this case (cf. FIGS. 6 and 8). Individual portions of this board 18 constitute horn sensors 20 responsible for the actual generation of an acoustic alarm signal.

Each of the horn sensors 20 is aligned in an element plane E and has a deflectable trigger component 22 in the form of a bar-shaped portion. The bar-shaped portion in this case is in the form of a tongue integrally connected at one end to the remaining board 18. In this example, the trigger component 22 is milled out of the printed board. The bar-shaped portion has a length of approx. 1.5 cm in the shown example.

In the transition area from the trigger component 22 to the residual board 18 a strain gauge 24 is applied the electric resistance of which changes when its geometry changes. This resistance or possibly also another electronic value defined by the strain gauge changes when the trigger component 22 is deflected. By this an electric signal used to generate an acoustic alarm signal is produced, as will be explained in detail hereinafter.

At the free end of the trigger component 22 a deflecting portion 26 is provided to which a force F is applied for deflecting the trigger component 22 when an acoustic alarm signal is to be generated.

Figure 5:
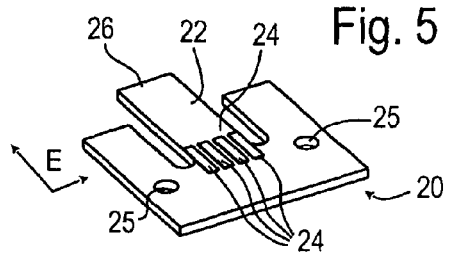
FIG. 5 is a perspective view of the horn sensor of FIG. 3.

The strain gauge 24 is arranged directly in the transition of the trigger component 22 to the remaining board 18 in this case. In this example four strain gauges 24 extending in parallel to each other are provided. For reasons of clarity all of them are provided with reference numerals in FIG. 5 only. Each strain gauge 24 consists of a thin layer of a known resistance varnish printed onto the board 18.

As a matter of course, also a different geometry can be chosen for the strain gauge 24, especially in the form of one single connected line having portions extending in parallel. Moreover, any other type of known strain gauges, as they are employed in laboratory or bathroom scales, for instance, of any suited material can be used.

Figure 7:
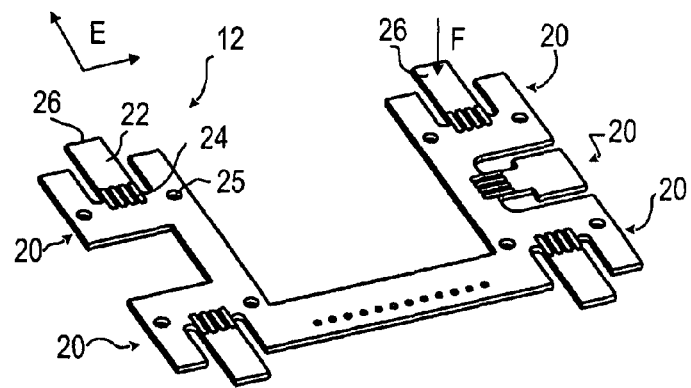
FIG. 7 is a schematic perspective view of the horn module of FIG. 6.

The FIGS. 6 and 7 illustrate the entire horn module 12. The board 18 is approximately U-shaped. At each of the four corner points of the U a horn sensor 20 is arranged, wherein the trigger components 22 of two respective neighboring horn sensors 20 point away from each other. A fifth optional horn sensor 20 is provided between two of the horn sensors 20 at the corners, on the right leg of the U in FIG. 6, wherein the trigger component 22 thereof points outwardly. All five horn sensors 20 are aligned in the same element plane E.

At this fifth horn sensor 20 a weight is mounted to a broad scoop-shaped surface. This sensor generates a signal when the vehicle passes a bumpy road by which signal the other horn sensors 20 can be switched off so as to prevent faulty triggering of acoustic alarm signals.

The horn module 12 moreover includes an evaluation circuit 29 (schematically indicated in FIG. 6 only) which is equally disposed on the board 18 and which processes the electronic values defined by the strain gauges 24 into an acoustic alarm signal.

The signal processing especially comprises for each horn sensor 20 a Wheatstone bridge converting the resistance value of the strain gauge 24 to a voltage correlating thereto (not shown).

The horn module 12 is mounted in the hub area 10 of the steering wheel such that with an inserted airbag module 15 contact points 30 arranged at corresponding positions at the lower side of the airbag module 15 are in contact with the deflecting portions 26 of the trigger components 22. In the shown case the contact points 30 are simply constituted by screws screwed into the bottom of the airbag module 15. At this position no electric contact but merely a mechanical contact is made. It is not necessary that the board 18 is electrically conductive in the area of the deflecting portions 26. The entire signal generation takes place in the strain gauges 24 and is not based on an electric contact established between the airbag module 15 and the trigger component 22.

In the unloaded neutral initial state the airbag module 15 already presses somewhat onto the trigger components 22 so that they are biased by a predetermined degree. In this way, distance tolerances during assembly of the airbag module 15 and the horn module 12 can be compensated.

The evaluation circuit 29 of the horn module 12 detects the resistance value which the strain gauge 24 shows in this home state and the associated voltage value. The latter is processed by the evaluation circuit 29 into a zero value. This is done, for instance, at a predetermined starting time, e.g. upon each start of the vehicle. Such zero value is established for each individual horn sensor 20. Based on said zero value, variations of the electronic value defined by the strain gauges 24 are taken up, processed and interpreted by the evaluation circuit 29.

In order to operate the horn, i.e. to produce an acoustic alarm signal, the driver presses onto the airbag module 15 and applies to the latter a force directed into the hub area 10 that acts perpendicularly to the element plane E of the horn module 12. Thus a force F acts from the contact points 30 of the airbag module 15 onto the deflecting portions 26 of the trigger components 22 of the horn sensors 20 of the horn module 12. Hereby the trigger components 22 are deflected elastically downwards (in FIG. 2), whereby the electronic value defined by the strain gauge 24 changes. In order to produce a measurable signal in the geometry shown here merely a maximum deflection of approx. 0.2 mm is required, i.e. only a minimum shift of the airbag module 15 in the direction of the hub area 10.

If the driver releases the airbag module 15 again, a reset member (not shown) ensures that the airbag module 15 is moved back to its home position.

The horn module 12 is mounted to the hub area 10 via mounting positions 25. It can also be mounted, as a matter of course, to a component connected to the hub area 10. The mounting positions 25 (not all of which are provided with reference numerals in the Figures) are formed here by simple bores in the board 18 through which for instance the screws screwed to the hub area 10 or to a component fixed to the hub are inserted. The mounting can be effectuated in any suited way, viz. also by clips, hot caulking or ultrasonic welding. In this example, two respective mounting positions 25 are provided at the side of the trigger components 25 in each horn sensor 20. Via the mounting positions 25 also the entire horn module 12 is mounted to the hub area 10.

Figure 4:
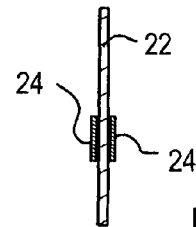
FIG. 4 is a section across the horn sensor along the line IV-IV of FIG. 3.
Figure 3:
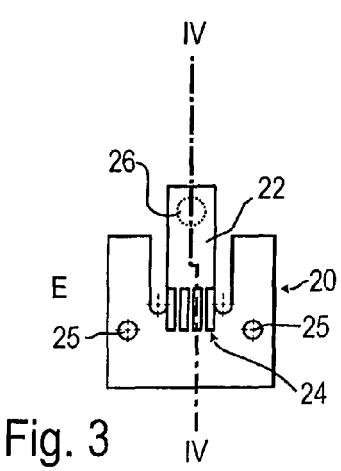
FIG. 3 is a schematic top view onto a horn sensor of a horn module according to the invention.

In addition to the strain gauges 24 disposed on the upper side of the horn sensor 20 shown in the Figures, on the respective opposite lower side of the horn sensors 20 equally at least one strain gauge 24 is provided (one of which is indicated in FIG. 4). In this way, it is easily possible to distinguish a change of the electronic value defined by the strain gauges 24 triggered by pressing down the airbag module 15 from a change by virtue of thermal expansion, for instance.

The evaluation circuit 29 is also capable of filtering out interference signals, for instance due to the shorter duration, as they occur by passing a bumpy road and by related vibrations of the airbag module 15 by the effect of inertia.

It is another advantage that the horn module can be tested before the airbag module is installed into the vehicle steering wheel, because all required circuits are integrated in the horn module itself.

As a matter of course, it would also be possible to mount the horn module 12 to the airbag module 15 and to arrange the contact points 30 fixed to the vehicle, e.g. in the hub area 10.

The invention claimed is:

1. A horn module for a vehicle steering wheel comprising:
   at least one electronic horn sensor (20) including a cantilevered trigger component (22) deflectable upon application of a horn operating force (F),
   wherein at the trigger component (22) at least one strain gauge (24) is arranged by deflection of which a signal is produced, the horn operating force (F) being applied to the cantilevered trigger component (22) at a location spaced from the at least one strain gauge (24).

2. The horn module according to claim 1, wherein the trigger component (22) includes a bar-shaped portion deflectable upon operating the horn.

3. The horn module according to claim 2, wherein the bar-shaped portion has a freely projecting end.

4. The horn module according to claim 1, wherein an evaluation circuit (29) is provided to perform signal processing.

5. The horn module according to claim 4, wherein the evaluation circuit (29) is designed so that it distinguishes between horn signals and short interference pulses.

6. The horn module according to claim 4, wherein the evaluation circuit (29) is programmed so that at a predetermined starting time they determine an electronic value defined by the strain gauge (24) as zero value.

7. The horn module according to claim 4, wherein the evaluation circuit (29) is arranged on a board (18) also supporting at least one of the horn sensors (20).

8. The horn module according to claim 1, wherein plural horn sensors (20) are provided.

9. The horn module according to claim 1, wherein in the vicinity of the strain gauge (24) mounting positions (25) are provided for mounting the horn sensor (20).

10. The horn module according to claim 1, wherein plural strain gauges (24) extending in parallel are provided.

11. The horn module according to claim 1, wherein the strain gauge (24) is formed by printing resistance varnish onto the horn sensor (20).

12. The horn module according to claim 1, wherein at least one strain gauge (24) is arranged on opposite sides of the horn sensor (20).

13. The horn module according to claim 1, wherein the trigger component (22) is mounted in a biased state.

14. A vehicle steering wheel comprising a horn module according to claim 1, wherein an airbag module (15) at which at least one contact point (30) is provided for contacting a trigger component (22) so as to deflect the trigger component (22) is movably arranged in a hub area of the vehicle steering wheel.

15. The horn module according to claim 1, wherein at least one strain gauge (24) is arranged on a pair of sides of the trigger component (22) that face away from one another.

16. A horn module for a vehicle steering wheel comprising:
   at least one electronic horn sensor (20) including a trigger component (22) having a bar-shaped portion deflectable upon application of a horn operating force (F),
   wherein at the trigger component (22) at least one strain gauge (24) is arranged by deflection of which a signal is produced, the at least one strain gauge (24) being positioned at the transition of the bar-shaped portion to the remaining trigger component (22).

17. A horn module for a vehicle steering wheel comprising:
   at least one electronic horn sensor (20) including a trigger component (22) deflectable upon application of a horn operating force (F), the trigger component (22) constituting a portion of a board (18), board;
   wherein at the trigger component (22) at least one strain gauge (24) is arranged by deflection of which a signal is produced.

18. The horn module of claim 17, wherein the board comprises a printed board.

* * * * *